Jan. 13, 1959

J. R. IRELAND 2,869,075

MAGNET CALIBRATING STABILIZER

Filed April 2, 1953

INVENTOR.
JAMES R. IRELAND,
BY
*Schley, Dash & Jenkins*
ATTORNEYS.

Jan. 13, 1959　　　　　J. R. IRELAND　　　　2,869,075
MAGNET CALIBRATING STABILIZER
Filed April 2, 1953　　　　　　　　　　　2 Sheets-Sheet 2
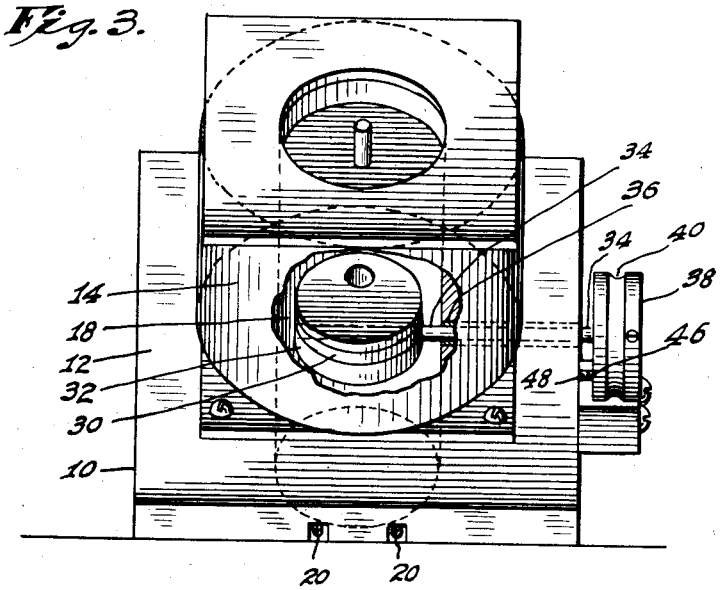
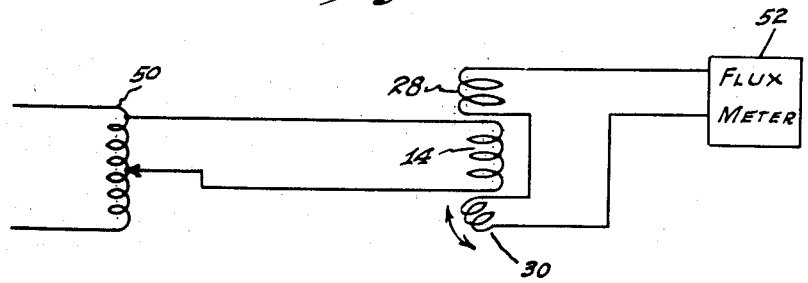
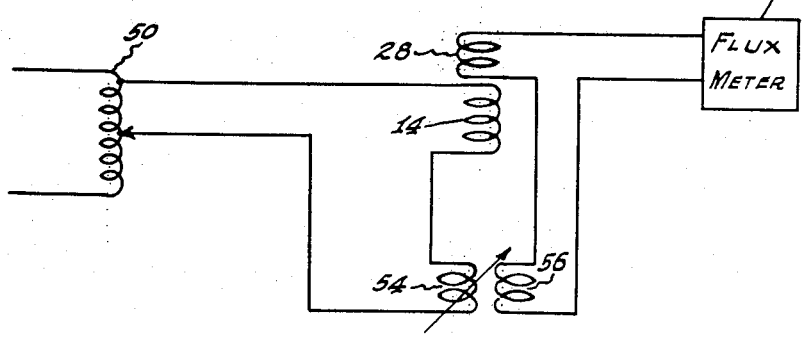
INVENTOR.
JAMES R. IRELAND,
BY
*Schley, Rash & Jenkins*
ATTORNEYS.

United States Patent Office 2,869,075
Patented Jan. 13, 1959

2,869,075
MAGNET CALIBRATING STABILIZER

James R. Ireland, Indianapolis, Ind., assignor to Thomas & Skinner, Inc., a corporation of Indiana Application April 2, 1953, Serial No. 346,379

4 Claims. (Cl. 324—42)

This invention relates to a device and method for stabilizing a permanent magnet at a predetermined strength, and for bringing a number of magnets to identical stabilized strengths.

Certain types of equipment require permanent magnets of identical magnetic strengths, and heretofore it has been a laborious process to produce them. It is the object of this invention to provide a device and method for producing such identical stabilized magnets easily and quickly. It is known to stabilize a magnet by first magnetizing it to a higher strength than desired, and then partially demagnetizing it to a lower strength, and that it will have increased stability at the lower strength. But heretofore it has been difficult to demagnetize the high strength magnet accurately to a predetermined stable point. It is an object of this invention to provide for readily demagnetizing high strength magnets to the same predetermined stable strength.

In accordance with the invention, a permanent magnet, formed of a suitable magnetic material, as of a high-energy magnetic material such as an "Alnico" alloy, and magnetized to a strength higher than the desired stabilized strength, preferably to saturation, is demagnetized in a controlled manner.

The magnet to be stabilized is inserted into test relation with a search or test coil connected in a test circuit to a fluxmeter in which the insertion movement produces a reading indicative of the strength, i. e., of the total flux, of the magnet; and with this test relation maintained, a demagnetizing field is applied to the magnet, as with a coil connected to an alternating voltage source, and the field is progressively increased in strength. As the demagnetizing field strength is increased, the magnet is progressively demagnetized and the flux change so produced in the magnet causes the reading on the fluxmeter to drop correspondingly. When the reading shows the magnet to be at the desired strength, the demagnetizing field is removed, leaving the magnet stabilized at the desired calibrated strength.

During such controlled demagnetizing with an alternating field, the test coil itself picks up an alternating flux which would appear as a vibration of the indicator of the fluxmeter, and such test-coil response to the demagnetizing field is eliminated by compensation in the test circuit. This is preferably done by including in the test circuit a compensating device which produces in the test circuit an induced voltage opposed to that induced by the field in the test coil. The compensating device is conveniently a compensating coil exposed to the demagnetizing field, or a mutual inductance between the demagnetizing circuit and the test circuit, and effectively isolated from the field of the permanent magnet. The compensating device is desirably made adjustable to permit the compensating opposed voltage to be adjusted to a value to effectively cancel out the voltage induced in the test coil by the demagnetizing field, and the fluxmeter then gives a stable reading indicative of the residual total flux of the magnet being demagnetized.

The accompanying drawings illustrate the invention. In such drawings:

Fig. 3 is a front elevation of the stabilizer shown in Fig. 1;

Fig. 4 is a diagram of an electrical circuit arrangement for use in the stabilizer of Fig. 1, in which the compensating device is an adjustable compensating coil; and Fig. 5 is a diagram of a modified circuit arrangement, in which the compensating device is a variable mutual inductance.

Figure 1:
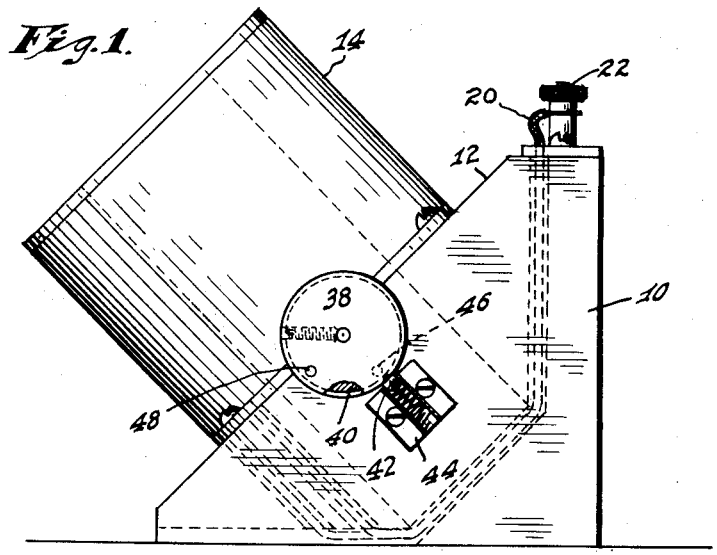
Fig. 1 is a side elevation of a magnet calibrating stabilizer embodying the invention.

The magnet calibrating stabilizer of Fig. 1 comprises a base 10 having an inclined front face 12 on which a demagnetizing coil 14 is supported in a convenient position for use. The coil 14 is wound on a hollow spool 16, which is fixed on the base 10 with its central opening in alignment with a bore 18 in the base 10. The leads 20 for the demagnetizing coil 14 extend through holes bored in the base and are connected to binding posts 22 carried at the top of the base. Within the central opening of the spool 16, there is positioned a holder 24 made of non-magnetic material such as wood or plastic, to receive the magnet 26 to be demagnetized, in this case a simple bar magnet. A search or test coil 28 is placed around the holder 24 to encircle the midposition of the magnet 26. The assembly of test coil 28 and magnet 26 is thus positioned co-axially within the core field of the demagnetizing coil 14.

Figure 2:
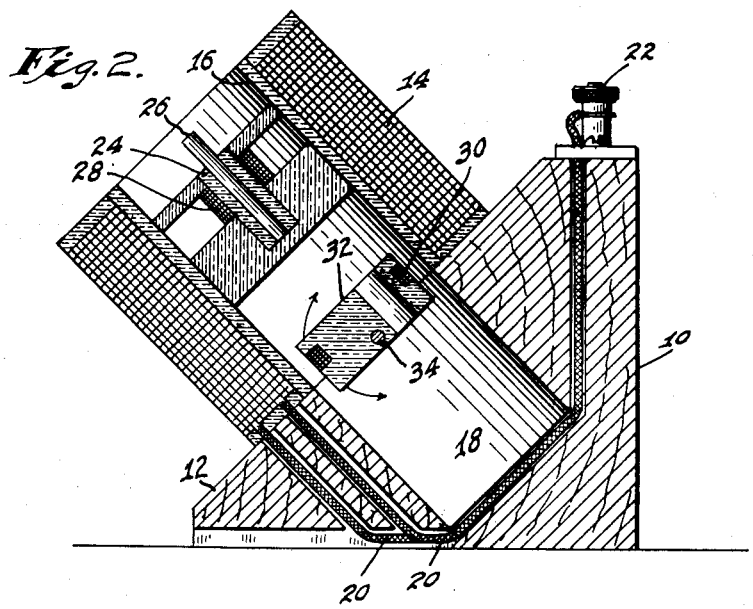
Fig. 2 is a central vertical section through the stabilizer shown in Fig. 1.

In that same field of the demagnetizing coil 14, but at the base of the coil 14 and thus at a point well spaced from the magnet 26, a compensating coil 30 is supported on a spool 32 carried by a rotatable shaft 34 extending diametrically of the compensating coil 30. As appears in Fig. 3, the shaft 34 is journalled in a sleeve bearing 36 carried in the base 10, and extends outward beyond the side of that base 10 where it is provided with a handle 38. To hold the rotatable parts in adjusted position, a drag brake is positioned to engage the handle 38. As shown, the handle is provided with a peripheral groove 40, and the brake comprises a ball 42 carried by a mounting block 44 and spring pressed into frictional engagement with the groove 40 in the handle. Rotation of the handle is desirably limited to less than 360° in order to avoid twisting the lead wires to the compensating coil 30. For this purpose, a fixed pin 46 projects from the side of the base 10 into the path of an inwardly projecting pin 48 carried by the handle 38. In the position shown in Fig. 2, the compensating coil 30 is co-axial with the demagnetizing coil 14 and will have a maximum induction linkage therewith and a certain polarity relation thereto. From this position, the compensating coil 30 may be rotated about the axis of the shaft 34 by manipulation of the handle 38. Such movement may be either clockwise or counter-clockwise to carry the compensating coil 30 to positions in which its axis is normal to the axis of the demagnetizing coil. Rotation of the compensating coil toward such a position will decrease its magnetic linkage with the demagnetizing coil, and when the axes of the two coils are normal to each other, the demagnetizing coil will induce no effective voltage at the terminals of the compensating coil. From this position of no magnetic linkage, the compensating coil can be rotated further, (clockwise in Fig. 2), to the position in which it is again coaxial with the demagnetizing coil 14 but reversed in polarity with respect thereto. In such reverse position the voltage induced in such compensating coil 30 by the demagnetizing coil will again be at a maximum, but will be of opposite polarity from that induced in the compensating coil in the position shown. The compensating coil can thus be adjusted by rotation of the handle 38 from a position of maximum induction linkage at one polarity through a position of no induction linkage to a position of maximum induction linkage of opposite polarity. The brake 42 associated with the handle 38 will hold the compensating coil 30 in any adjusted position within its range of adjustment.

In the circuit arrangement shown in Fig. 4, the demagnetizing coil 14 is connected to a variable source of alternating voltage, shown as a variable auto-transformer 50. The search or test coil 28 is exposed to the field of the demagnetizing coil 14 and is connected in a test circuit containing the compensating coil 30 and a fluxmeter 52. The compensating coil 30 lies in the field of the demagnetizing coil 14 at a point isolated from a magnet received in the test coil 28, and is rotatable to adjust its effective linkage to the demagnetizing field coil.

In the modified electrical arrangement shown in Fig. 5, the demagnetizing coil 14 is again connected to a variable source 50 of alternating voltage, and the demagnetizing circuit contains one winding 54 of a variable mutual inductance, the other winding 56 of which is connected in series with the test coil 28 and the fluxmeter 52 in the test circuit. The test coil 28 and the mutual inductance 54—56 are so related that the voltages induced therein from the demagnetizing circuit are of opposite polarity, i. e., are out of phase. In both the arrangement of Fig. 4 and that of Fig. 5, the variable inductance device in the test circuit, either the compensating coil 30 or the variable mutual inductance 54—56, is adjustable to produce in the test circuit an induced voltage having a variable relationship to the voltage induced in the test coil 28 by reason of its magnetic linkage to the field of the demagnetizing coil 14. The variable inductance device can thus be adjusted to compensate in the test circuit for the effect of the demagnetizing field on the test coil 28, to leave the test coil 28 effectively responsive only to the field or flux of the permanent magnet 26.

The use of the device of Figs. 1 to 4 to bring a series of similar magnets to identical magnetic strengths is as follows:

With one of the magnets 26 in place in the holder 24 and surrounded by the test coil 28, the auto-transformer 50 is adjusted to apply an alternating voltage to the demagnetizing coil 14. With the compensating coil 30 adjusted to a position in which it has no compensating effect, as to a position in which its axis lies normal to the axis of the demagnetizing coil 14, the induced alternating voltage in the test coil will produce large-amplitude vibration of the indicator of the fluxmeter 52. The compensating coil 30 is adjusted to a position to eliminate this vibration of the fluxmeter indicator, and in this adjusted position, the induced voltage in the test coil 28 will be offset by an opposed induced voltage in the compensating coil 30.

With the test circuit thus adjusted, and with the fluxmeter calibrated to give a zero reading in the absence of a magnet 26 in the holder 24, and with no voltage applied to the demagnetizing coil 14, an excessively magnetized magnet 26 is inserted in the holder 23. Upon the relative movement occurring during this insertion, the field of the magnet is cut by the test coil 28, and the fluxmeter indicator will move to an initial test position corresponding to the existing magnetic strength of the inserted magnet 26. Since the magnet will be magnetized to a strength greater than that desired, and desirably to saturation, its indicated strength will be greater than that desired for the magnets of the series. The auto-transformer 50 is now adjusted to apply an alternating voltage across the demagnetizing coil 14, and the resulting alternating field will partially demagnetize the magnet 26; and the extent of demagnetization will be indicated on the fluxmeter by movement of its indicator from its initial test position toward zero position. The strength of the demagnetizing voltage is increased until the fluxmeter indicates the desired magnetic strength for the magnet 26 being demagnetized. The demagnetizing voltage is then reduced to zero, and the magnet 26 is withdrawn. Its withdrawal movement induces a voltage in the test coil 26 which causes the fluxmeter indicator to move to its zero position.

This procedure is repeated with each magnet of the series, to bring them all to the desired predetermined stabilized strength.

If desired, instead of setting the fluxmeter to a zero reading, it may be adjusted initially to a predetermined point corresponding to the desired magnet strength. If the magnets 26 are then inserted with proper polarity, their insertion will cause the fluxmeter indicator to move to and past its zero point. The demagnetizing voltage will then be increased to cause the fluxmeter indicator to return to its zero point, and the magnet will then have the desired magnetic strength.

A sample group of bar magnets .1775 inch in diameter and .978 inch long and made of Alnico V alloy were manufactured in the usual way and magnetized. They were tested for magnetic strength in their as-magnetized condition, were then partially demagnetized to the same fluxmeter reading in a device of the type shown in the drawings, and were then re-checked for magnetic strength. The results were as follows:

| Percent Deviation from Average Stregnth | As Magnetized, Magnets | After Stabilizing Calibrating, Magnets |
| --- | --- | --- |
| Within 0.1 | 0 | 5 |
| Within 0.5 | 0 | 19 |
| Within 1.0 | 7 | 20 |
| Within 1.5 | 9 | |
| Within 2 | 10 | |
| Within 4 | 13 | |
| Within 7 | 20 | |

These results show that a high degree of accuracy is obtained in calibrating magnets in accordance with this invention.

I claim as my invention:

1. The method of calibrating a magnetized permanent magnet at a predetermined stabilized strength, which comprises moving the magnet to a fixed position relative to a test coil applying a demagnetizing field to the magnet and test coil, compensating the test coil response to offset the effect of the demagnetizing field thereon, and observing the resulting response as a measure of the residual magnetic strength of the magnet.

2. The method of calibrating a magnetized permanent magnet at a predetermined stabilized strength, which comprises applying an alternating demagnetizing field to the magnet, inductively sensing the combined magnet field and demagnetizing field, compensating the sensing response to offset the direct effect of the demagnetizing field therein, and observing the compensated response as a measure of the residual magnetism of the magnet.

3. The method of calibrating a magnetized permanent magnet at a predetermined stabilized strength, which comprises moving the magnet to a fixed position relative to a test coil, sensing the test coil response as a measure of the initial magnetic strength of the magnet, applying a progressively increasing demagnetizing field to the magnet and test coil, compensating the test-coil response to offset the effect of the demagnetizing field thereon, sensing the resulting response as a measure of the residual magnetic strength of the magnet, and removing the demagnetizing field when a predetermined response is sensed.

4. A device for demagnetizing a permanent magnet to a predetermined magnetic strength, comprising a fixture to receive a magnetized permanent magnet inserted axially therein, a demagnetizing coil and circuit to subject the received magnet to a demagnetizing field, a test circuit containing a test coil responsive to the magnet field during insertion movement of the magnet with respect to the fixture and responsive to changes in the field of the received magnet, a fluxmeter in the test circuit, said test coil being exposed to the demagnetizing field, and a compensating inductance magnetically linked to the demagnetizing coil circuit to create in the test circuit a voltage offsetting the voltage induced in the test coil by the demagnetizing geld, said inductance being a variable mutual inductance between the demagnetizing circuit and the test circuit and being substantially isolated from the field of the received magnet, whereby said fluxmeter indicates the field strength of the magnet and is not directly affected by the demagnetizing field.

References Cited in the file of this patent

UNITED STATES PATENTS

| | | |
|---|---|---|
| 1,686,815 | Imes | Oct. 9, 1928 |
| 1,897,634 | DeForest | Feb. 14, 1933 |
| 2,065,119 | Davis | Dec. 22, 1936 |
| 2,331,418 | Nolde | Oct. 12, 1943 |
| 2,412,617 | Jenkins | Dec. 17, 1946 |
| 2,421,583 | Stuart | June 3, 1947 |
| 2,542,057 | Relis | Feb. 20, 1951 |

UNITED STATES PATENT OFFICE
CERTIFICATE OF CORRECTION

Patent No. 2,869,075  January 13, 1959

James R. Ireland

It is hereby certified that error appears in the printed specification of the above numbered patent requiring correction and that the said Letters Patent should read as corrected below.

Column 4, line 45, after "test coil" insert a comma; column 5, line 7, for "geld" read -- field --.

Signed and sealed this 19th day of May 1959.

(SEAL)
Attest:

KARL H. AXLINE
Attesting Officer

ROBERT C. WATSON
Commissioner of Patents